（12）United States Patent
Goss et al.

(10) Patent No.: US 7,630,814 B2
(45) Date of Patent: Dec. 8, 2009

(54) CONTROL SYSTEM FOR THE PARKING BRAKE OF A BRAKE SYSTEM IN A MOTOR VEHICLE

(75) Inventors: Stefan Goss, Brunn (DE); Alexander Kalbeck, Burglengenfeld (DE); Damiano Molfetta, Wetzikon (CH)

(73) Assignee: Siemens Aktiengesellschaft, Munich (DE)

( * ) Notice: Subject to any disclaimer, the term of this patent is extended or adjusted under 35 U.S.C. 154(b) by 215 days.

(21) Appl. No.: 11/573,820

(22) PCT Filed: Jul. 7, 2005

(86) PCT No.: PCT/EP2005/053257

§ 371 (c)(1),
(2), (4) Date: Feb. 16, 2007

(87) PCT Pub. No.: WO2006/018354

PCT Pub. Date: Feb. 23, 2006

(65) Prior Publication Data

US 2008/0147286 A1    Jun. 19, 2008

(30) Foreign Application Priority Data

Aug. 17, 2004   (DE) .................. 10 2004 039 866

(51) Int. Cl.
G06F 19/00  (2006.01)
(52) U.S. Cl. .......................................... 701/70; 701/78
(58) Field of Classification Search ........................ None
See application file for complete search history.

(56) References Cited

U.S. PATENT DOCUMENTS

| 4,821,854 | A   | * | 4/1989 | Koshizawa ................... 477/74 |
| 5,417,624 | A   | * | 5/1995 | Weissbrich et al. ........... 477/71 |
| 6,723,023 | B2  | * | 4/2004 | Murakami .................. 477/210 |
| 6,748,311 | B1  | * | 6/2004 | Walenty et al. ............... 701/70 |
| 7,206,682 | B2  | * | 4/2007 | Bodin et al. .................. 701/67 |
| 2004/0026988 | A1 |  | 2/2004 | Ewinger et al. ............... 303/89 |

FOREIGN PATENT DOCUMENTS

DE    37 19 683    6/1987
DE    198 14 657   4/1998

OTHER PUBLICATIONS

International Search Report; PCT/EP2005/053257; pp. 6, Oct. 28, 2005.

* cited by examiner

*Primary Examiner*—Richard M. Camby
(74) *Attorney, Agent, or Firm*—King & Spalding L.L.P.

(57) ABSTRACT

In a system for controlling a parking brake of a brake system of a motor vehicle, a first target value for the braking force of the parking brake is predefined by a operating element for the parking brake and the braking force for the parking brake is released by a operating element. When a start-up intention is detected, the control system minimizes the braking force of the parking brake in relation to the first target value, in accordance with the environmental conditions of the motor vehicle. For the first time a provisional minimization of the braking force of a parking brake for a foreseeable start-up situation is permitted, thus allowing the start-up operation of a motor vehicle to be as comfortable as possible with maximum security of the automatic functions. The system is particularly suitable for electromechanical parking brakes.

19 Claims, 2 Drawing Sheets

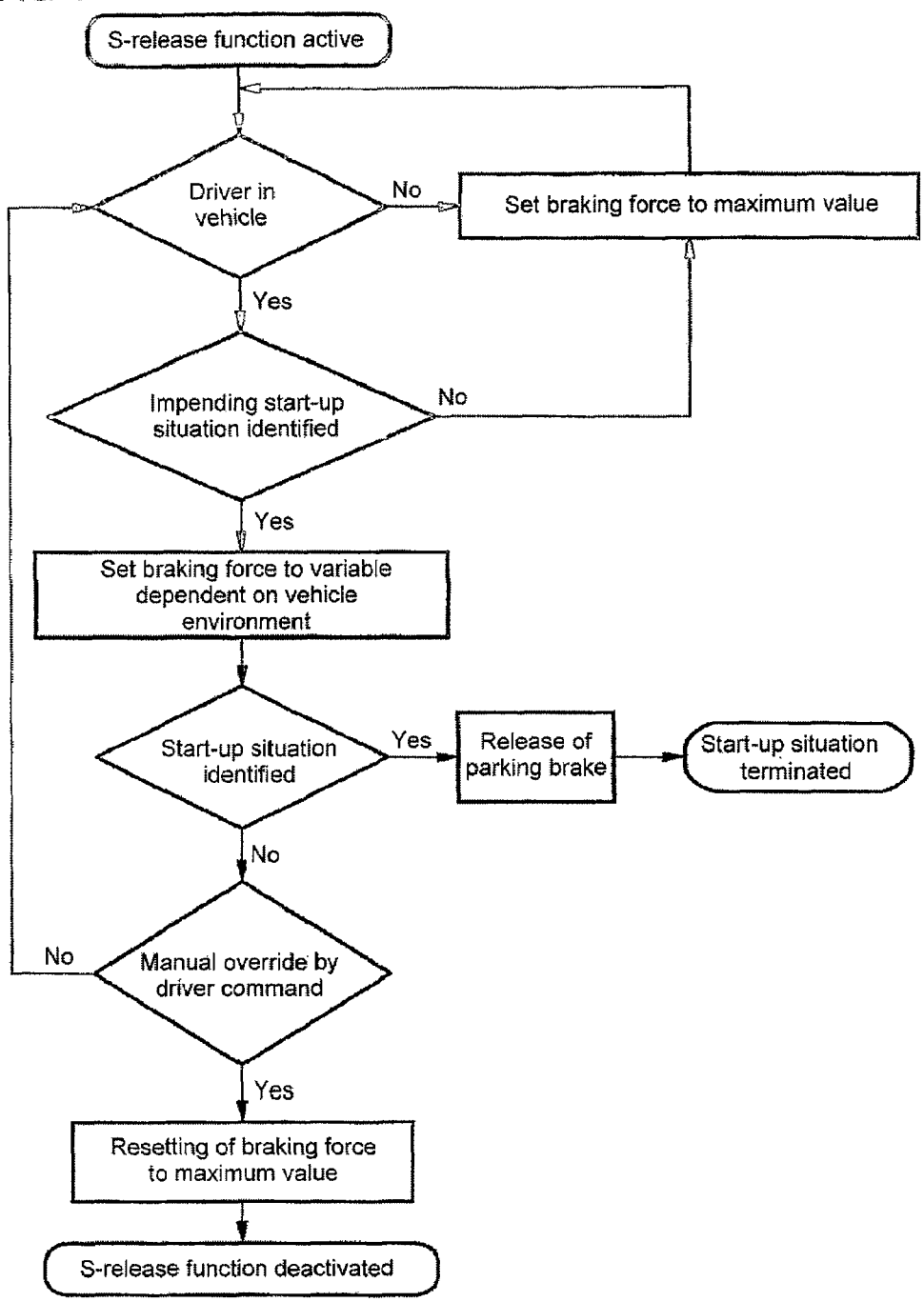

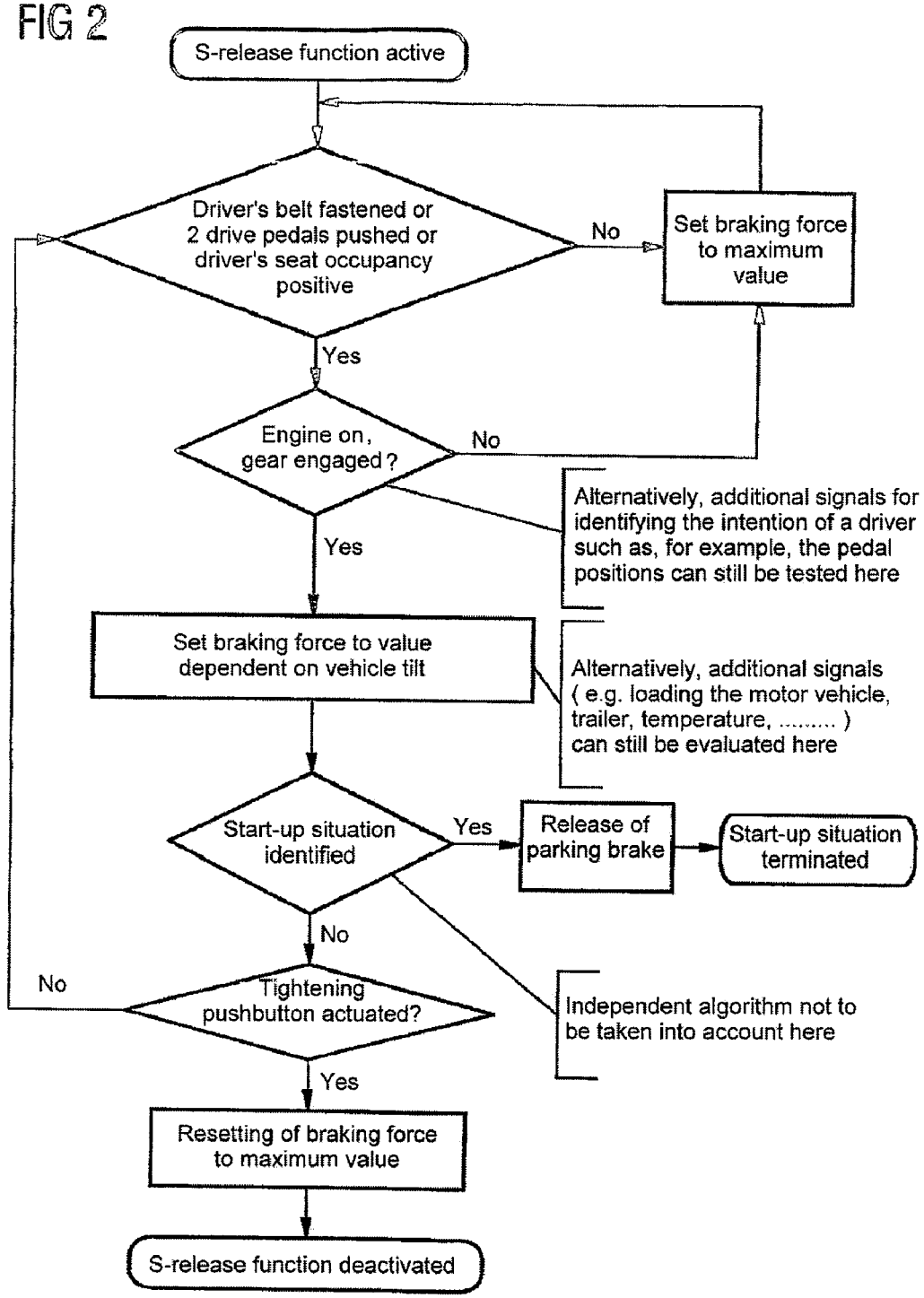

CONTROL SYSTEM FOR THE PARKING BRAKE OF A BRAKE SYSTEM IN A MOTOR VEHICLE

CROSS-REFERENCE TO RELATED APPLICATIONS

This application is a U.S. national stage application of International Application No. PCT/EP2005/053257 filed Jul. 7, 2005, which designates the United States of America, and claims priority to German application number 10 2004 039 866.6 filed Aug. 17, 2004, the contents of which are hereby incorporated by reference in their entirety.

TECHNICAL FIELD

The invention relates to a system for controlling a parking brake of a brake system of a motor vehicle, a first target value for the braking force of the parking brake being predefined by an operating element for the parking brake and the braking force for the parking brake being released by an operating element.

BACKGROUND

Brake systems in motor vehicles with automatic functions for supporting start-up, such as, for example, the independent release of the applied emergency brake or parking brake on starting up may cause comfort problems, in particular as the motor vehicle moves off from the stationary position, because the time for releasing the parking brake considerably influences the dynamics of the motor vehicle. In particular, in the case of electrical parking brakes, which are controlled by an electric motor transmission unit, the duration of the releasing process depends on the force used in the applied state or the distance of travel of the braking mechanics.

The time taken for release, for example, of an applied electrical parking brake with a mechanical brake system, is of the order of magnitude of approximately one second (1 s) or several 100 ms. However, in the case of a quick start-up maneuver it is possible for the time from the moment when the driver's intention to start up is signaled to the moment when the motor vehicle actually starts off to be considerably shorter.

The result of the difference in these times can be, that at the point in time of the expected movement of the motor vehicle such a high braking torque is still applied that the desired movement of the motor vehicle is restrained unnecessarily in this way and/or that there are unwanted comfort problems (such as, for example, "bucking" when starting up).

In the case of a few previous brake systems, these problems occur less frequently if the start-up functions are performed by an expensive, fast-acting hydraulic system (e.g. ESP) or the braking mechanisms used there do not have any major dynamic effects in this context.

For the purpose of preventing increased wear and tear of the brake system in a motor vehicle, it is also known from DE 198 14 657 A1 or DE 100 61 064 B4 that the braking force must be selected in accordance with the motor vehicle-specific characteristic values.

SUMMARY

The object of the present invention is to specify an improved system for the safe and efficient control of a parking brake or a parking brake function of a brake system in a motor vehicle, which in particular prevents the comfort problems in a motor vehicle on start-up as described in the introduction.

This object can be achieved by a system for controlling a parking brake of a brake system of a motor vehicle, in which by means of a control element, a first target value for the braking force of the parking brake is predefined, and in which by means of a control element, the braking force for the parking brake can be released, wherein the control system minimizes the braking force of the parking brake in relation to the first target value, in accordance with the ambient conditions of the motor vehicle.

BRIEF DESCRIPTION OF THE DRAWINGS

Additional information and further advantages of the invention are described below with reference to preferred examples of embodiments in conjunction with the accompanying drawings. These schematic diagrams are as follows:

FIG. 1 a flowchart of an abstracted control program of a control system according to the invention; and FIG. 2 a flowchart according to FIG. 1 in a more detailed embodiment.

DETAILED DESCRIPTION

According to an enhancement, the detection of a person on the driver's seat, the starting of the engine, the actuating of the clutch or another driver pedal and/or the engaging of a gear or an automatic gearshift phase can be interpreted as a start-up intention. According to an enhancement, its inclination, its load, its tire pressure, its ambient temperature, the wear and tear and/or the ageing or the changes in the brake system or in its components can be detected as the ambient conditions of the motor vehicle. According to an enhancement, on the detection of a discontinuation of a start-up intention, a first target value can be again predefined for the braking force of the parking brake. According to an enhancement, the detection of an unoccupied driver's seat, the turning off of the engine, the disengaging of a gear or a transmission setting and/or specific pedal combinations can be interpreted as the discontinuation of a start-up intention. According to an enhancement, a first target value for the braking force may correspond to a maximum target value for predetermining the braking force for the parking brake. According to an enhancement, a first target value for the braking force may correspond to a start value, with measuring processes being performed at a specific time interval to determine the measured values of the ambient conditions of the motor vehicle, and with a current target value reduced in relation to the first target value being able to be determined for predetermining the braking force for the parking brake. According to an enhancement, the target values for the minimized or the reduced braking force can be stored in a performance graph, in a characteristic curve and/or in a table. According to an enhancement, the stored target values for the braking force can be adapted on the basis of the current target values determined in the measuring process.

According to different embodiments, when an intention to start up is detected, the control system minimizes the braking force of the parking brake in relation to the first target value, in accordance with the ambient conditions of the motor vehicle. This reduces the time needed at a later point in time for the release process, which advantageously prevents the comfort problems in a motor vehicle on start-up, as described in the introduction.

The following preferred methods of interpreting an intention to start up have proven successful: In particular the detection of a person, especially of a (where necessary authorized) driver of a motor vehicle on the driver's seat of a motor vehicle, the starting of the engine, the actuating of the clutch or another pedal by the driver and/or the engaging of a gear or an automatic gearshift phase.

The following are preferably detected as the ambient conditions of the motor vehicle: its inclination, its load, the tire pressure, the ambient temperature, the wear and tear and/or the ageing or the changes in the brake system or in its components such as the supply lines, the cables, the brake linings, the actuating devices, etc.

According to an embodiment, on detection of a discontinuation of an intention to start up, a first target value for the braking force of the parking brake is again predefined, with preferably especially the detection of an unoccupied driver's seat, the turning off of the engine, the disengaging of a gear or a gearshift phase and/or specific pedal combinations being able to be employed as the interpretation of the discontinuation of the intention to start up.

Expediently the first target value for the braking force corresponds to a maximum target value, i.e. the standard target value or the (current) operating target value in order to specify the braking force for the parking brake.

Alternatively or cumulatively to this, a first target value for the braking force can correspond to a start value, with, preferably at a specific time interval, measuring processes for the determination of the measured values of the ambient conditions of the motor vehicle being able to be undertaken, and with a current target value which is reduced in relation to the first target value—but not minimized—being determined on the basis of the measured value in order to predetermine the braking force for the parking brake.

The target values for the minimized or the reduced braking force are stored in a performance graph, in a characteristic curve and/or in a table in each case.

In addition provision can be made for adapting the stored target values for the braking force on the basis of the current target values determined in the measuring process.

The present invention permits a "predictive" minimizing of the braking force during a detected possible/potential start up situation to be used for the first time to design the actual start-up situation to be as comfortable as possible without any adverse impact on safety. In this context, a possible start-up situation refers to the physical-technical possibility of moving the vehicle off (the engine running, the gear engaged, etc. . . . ). On the other hand, the potential starting up situation is defined by means of variables which can be measured and which are directed at the intention of the driver of a motor vehicle (his/her presence, the pedal actions, etc. . . . ). Finally, the current starting-up situation is defined by implementing the possible/potential starting-up intention (pressing the gas pedal, releasing the clutch, etc. . . . ).

As can be seen in FIGS. 1 and 2, according to an embodiment, in the event of a possible/potential preparation to start a motor vehicle moving identified by an electronic control or a regulation of a braking device, for the braking force of for example a parking brake to be reduced or released early in as far as possible so that this (ideally "still just") satisfies the ambient conditions of the motor vehicle to maintain it in its current position, which in turn corresponds to a minimum target value for specifying the braking force for the parking brake. On the other hand, for the process of applying the parking brake, the maximum, i.e. a standard target value or a (current) operational target value or at least one important braking force significantly exceeding the minimum target value is set in this case.

However, if, prior to the start-up, by means of monitoring or detecting different motor vehicle signals (such as for example the clutch, the transmission setting engaged, the gear engaged, the driver of a motor vehicle present, the seatbelt of the driver fastened, etc. . . . ), a start-up to be expected is detected here—also referred to as a possible/potential start-up intention—and the current applied braking force or the braking torque of the brake system corresponding to this is automatically reduced until it conforms to the minimum required braking torque adapted to the ambient condition of the motor vehicle, which is required to keep the motor vehicle—if required, with a certain added margin of safety—in its current position in a reliable manner. When the vehicle does actually start off, this advantageously reduces the actuator travel or the braking component travel needed to release the brake and thereby the time needed for the releasing process, so that the comfort problems are avoided in an advantageous way.

If it is identified before the start-up that the possible/potential start-up intention no longer exists (for example, a gear is no longer engaged or the driver of the motor vehicle is not present, etc. . . . ), then the braking torque will automatically for example again be increased to the first maximum value in this case.

In addition, in a preferred manner the driver of the motor vehicle should also be allowed, during an—as has already been described—actively set function, to restore a higher braking force or the full braking force, by manually operating a operating element, for example by actuating the normal brake application button. This will simultaneously deactivate the function of the premature minimizing of the braking force (S-release) at least temporarily.

A subsequent process or event to be defined (for example, actuator/brake released or ignition off or operation of a specified element, change in the initial S-release conditions . . . ) should activate the S-release function again to the previously mentioned extent.

The advantage of the present invention is that the braking effect in the event of there being no possible/potential start-up intention or the driver leaving the motor vehicle or wishing to do so, the braking effect of the parking brake is always for example automatic and at its maximum and thereby safety-critical cases in which a reduced braking torque is possibly not sufficient to keep the motor vehicle stable (loading of a motor vehicle on a slope, a reduction in the braking torque caused by mechanical characteristics over longer periods in time, etc. . . . ) is avoided in an advantageous manner without the intervention of the driver. This increases the safety of the automatic braking system without the comfort of the start-up process being reduced, compared with systems known from the prior art, as described in the introduction.

This invention permits for the first time a provisional minimization of the braking force of a parking brake for a foreseeable start-up situation, thus allowing the start-up operation of a motor vehicle to be as comfortable as possible with maximum security of the automatic functions. The system is particularly suitable for electromechanical parking brakes.

The invention claimed is:

1. A system for controlling a parking brake of a brake system of a motor vehicle, comprising:
an operating element operable to engage the braking force of the parking brake using a target value, and further operable to release the braking force for the parking brake;
wherein upon detection of a start-up intention, the control system is operable to minimize the braking force of the parking brake in relation to the target value, the minimized braking force of the parking brake being determined based on one or more ambient conditions of the motor vehicle.

2. The system as claimed in claim 1, wherein detection of a start-up intention includes one or more of the detection of a person on the driver's seat, the starting of the engine, the actuating of the clutch or another driver pedal, and the engaging of a gear or an automatic gearshift phase.

3. The system as claimed in claim 1, wherein the one or more ambient conditions of the motor vehicle include at least one of its inclination, its load, its tire pressure, its ambient temperature, the wear and tear, and the ageing or the changes in the brake system or in its components.

4. The system as claimed in claim 1, wherein, on the detection of a discontinuation of a start-up intention, the control system is operable to restore the braking force of the parking brake to the target value.

5. The system as claimed in claim 4, wherein the discontinuation of a start-up intention is detected by one or more of the detection of an unoccupied driver's seat, the turning off of the engine, the disengaging of a gear or a transmission setting, and specific pedal combinations.

6. The system as claimed in claim 1, wherein the target value for the braking force corresponds to a predetermined maximum target value for the braking force for the parking brake.

7. The system as claimed in claim 1, wherein the target value for the braking force is determined based on measured values of the one or more ambient conditions of the motor vehicle, the target value being greater than the minimized braking force.

8. The system as claimed in claim 1, wherein values for the minimized braking force based on one or more ambient conditions of the motor vehicle are stored in a performance graph, in a characteristic curve, or in a table.

9. The system as claimed in claim 8, wherein the stored values for the minimized braking force are adapted on the basis of current measured values of the one or more ambient conditions.

10. A method for controlling a parking brake of a brake system of a motor vehicle, comprising the steps of:
setting a target value for the braking force of the parking brake by an operating elements;
detecting one or more ambient conditions of the motor vehicle; and
in response to detecting a start-up intention, reducing the braking force of the parking brake from said set target value to a minimized braking force without releasing the parking brake by said operating element, the minimized braking force being based on the detected one or more ambient conditions of the motor vehicle.

11. The method as claimed in claim 10, wherein detection of a start-up intention includes one or more of the detection of a person on the driver's seat, the starting of the engine, the actuating of the clutch or another driver pedal, and the engaging of a gear or an automatic gearshift phase.

12. The method as claimed in claim 10, wherein detecting one or more ambient conditions of the motor vehicle includes detecting at least one of its inclination, its load, its tire pressure, its ambient temperature, the wear and tears, and the ageing or the changes in the brake system or in its components.

13. The method as claimed in claim 10, further comprising, upon detection of a discontinuation of the start-up intention, the control system restoring the braking force of the parking brake to the target value.

14. The method as claimed in claim 13, wherein detection of a discontinuation of the start-up intention includes one or more of the detection of an unoccupied driver's seat, the turning off of the engine, the disengaging of a gear or a transmission setting, and specific pedal combinations.

15. The method as claimed in claim 10, wherein the target value for the braking force corresponds to a predetermined maximum target value for the braking force for the parking brake.

16. The method as claimed in claim 10, wherein the target value for the braking force is determined based on measured values of the one or more ambient conditions of the motor vehicle, the target value being greater than the minimized braking force.

17. The method as claimed in claim 10, wherein values for the minimized braking force are stored in a performance graph, in a characteristic curve, or in a table.

18. The method as claimed in claim 17, wherein the stored values for the minimized braking force are adapted on the basis of current measured values of the one or more ambient conditions.

19. A system for controlling a parking brake of a brake system of a motor vehicle, comprising:
an operating element operable to predefine a first target value for the braking force of the parking brake, and further operable to release the braking force for the parking brake;
wherein the control system minimizes the braking force of the parking brake in relation to the first target value, in accordance with the ambient conditions of the motor vehicle, and wherein target values for the minimized braking force are stored in at least one of: a performance graph, a characteristic curve, and a table.

* * * * *